(12) United States Patent
Ishimoto et al.

(10) Patent No.: US 8,562,072 B2
(45) Date of Patent: Oct. 22, 2013

(54) VEHICULAR SEAT

(75) Inventors: Manabu Ishimoto, Chiryu (JP); Keisuke Ishizaki, Nishio (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 12/867,632

(22) PCT Filed: Jun. 24, 2009

(86) PCT No.: PCT/JP2009/061523
§ 371 (c)(1),
(2), (4) Date: Aug. 13, 2010

(87) PCT Pub. No.: WO2010/150372
PCT Pub. Date: Dec. 29, 2010

(65) Prior Publication Data
US 2012/0112510 A1    May 10, 2012

(51) Int. Cl.
*B60N 2/42* (2006.01)
*B60R 22/28* (2006.01)

(52) U.S. Cl.
USPC .................................. 297/216.12; 297/408

(58) Field of Classification Search
USPC ........................................ 297/408, 216.12
See application file for complete search history.

(56) References Cited

U.S. PATENT DOCUMENTS

| | | | |
|---|---|---|---|
| 3,885,831 A | 5/1975 | Rasmussen | |
| 2002/0093231 A1 | 7/2002 | Estrada et al. | |
| 2003/0001414 A1* | 1/2003 | Humer et al. | 297/216.12 |
| 2006/0163930 A1 | 7/2006 | Pettersson et al. | |
| 2007/0108827 A1 | 5/2007 | Clough | |

FOREIGN PATENT DOCUMENTS

| | | |
|---|---|---|
| GB | 2 315 997 A | 2/1998 |
| JP | Y2-3-13377 | 3/1991 |
| JP | A-10-236201 | 9/1998 |
| JP | A-11-89665 | 4/1999 |
| JP | A-2000-217660 | 8/2000 |
| JP | A-2000-219069 | 8/2000 |
| JP | A-2003-81044 | 3/2003 |
| JP | A-2008-18842 | 1/2008 |

OTHER PUBLICATIONS

Apr. 24, 2012 Office Action issued in Japanese Patent Application No. 2010-508537 (with translation).
Chinese Office Action dated May 3, 2012 from Chinese Patent Application No. 200980124780.8 (with translation).
International Search Report issued in Patent Application No. PCT/JP2009/061523, dated Oct. 13, 2009 (with translation).
Oct. 18, 2012 European Search Report issued in European Patent Application No. 09846505.7.

* cited by examiner

*Primary Examiner* — Milton Nelson, Jr.
(74) *Attorney, Agent, or Firm* — Oliff & Berridge, PLC

(57) ABSTRACT

A headrest can be rotated with respect to a seatback, and support strength in a vertical direction of the headrest can be improved. In a vehicular seat, lower side curved surfaces of headrest supports, to which leg portions of a headrest are coupled, slide on lower ends of support brackets and upper side curved surfaces of the headrest supports slide on upper ends of the support brackets, whereby rotation of the headrest supports about an axis along a horizontal direction of a seatback with respect to the support brackets is guided. Further, the lower side curved surfaces touch the lower ends of the support brackets and the upper side curved surfaces touch the upper ends of the support brackets, whereby movement of the headrest supports in a vertical direction of the seatback with respect to the support brackets is suppressed.

5 Claims, 20 Drawing Sheets

VEHICULAR SEAT

TECHNICAL FIELD

The present invention relates to a vehicular seat equipped with a headrest.

BACKGROUND ART

In the headrest support structure described in patent document 1, a headrest guide, to which a headrest stay is coupled, is supported such that it can tilt in an anteroposterior direction with respect to a headrest bracket disposed on a frame of a seatback, and the headrest guide is energized backward by a spring. In this structure, the natural frequency of the headrest is freely set by changing the spring constant of the spring to ensure that the headrest does not resonate with the seatback, and the headrest is made to function as a dynamic damper with respect to vibration of the seatback to reduce vibration of the seat.
Patent Document 1: Japanese Examined Utility Model Application Publication No. 3-13377

DISCLOSURE OF THE INVENTION

Problem to be Solved by the Invention

However, as described above, in the support structure, in order to make the headrest guide tiltable in the anteroposterior direction with respect to the headrest bracket, it is necessary to impart play in a vertical direction between the headrest guide and the headrest bracket. For this reason, support strength in the vertical direction of the headrest with respect to the seatback becomes lower, and there is the potential for this to lead to rattling of the headrest and a drop in merchantability.

In consideration of the circumstances described above, it is an object of the present invention to obtain a vehicular seat where the headrest can be rotated with respect to the seatback and which can improve support strength in the vertical direction of the headrest.

Means for Solving the Problem

A vehicular seat pertaining to the invention according to an aspect of the invention is a vehicular seat equipped with a headrest support to which a leg portion of a headrest is coupled and a support body that is disposed on a frame of a seatback and supports the headrest support, wherein the headrest support and the support body slidably touch each other at curved surfaces disposed on either one or both, rotation of the headrest support about an axis along a horizontal direction of the seatback with respect to the support body is guided by sliding at the curved surfaces, and movement of the headrest support in a vertical direction of the seatback with respect to the support body is suppressed by touching at the curved surfaces.

In the vehicular seat according to an aspect of the invention, the headrest support and the support body slidably touch at the curved surfaces disposed on either one or both, and rotation of the headrest support about an axis along the horizontal direction of the seatback with respect to the support body is guided by sliding at the curved surfaces. Thus, the headrest, whose leg portion is coupled to the headrest support, can be rotated with respect to the seatback. Moreover, movement of the headrest support in the vertical direction of the seatback with respect to the support body is suppressed by touching at the curved surfaces. Thus, support strength in the vertical direction of the headrest can be improved because movement of the headrest support, whose leg portion is coupled to the headrest support, in the vertical direction with respect to the seatback is suppressed.

A vehicular seat pertaining to another aspect of the invention includes energizing means that energize the headrest support toward a predetermined position in its range of rotation with respect to the support body.

In the vehicular seat according to this aspect of the invention, the energizing means energize the headrest support toward a predetermined position in its range of rotation with respect to the support body. Thus, a situation where the headrest coupled to the headrest support needlessly rotates with respect to the seatback can be suppressed. Further, for example, by giving the vehicular seat a configuration where the headrest support is energized toward an intermediate position in its range of rotation with respect to the support body, the headrest can be made to function as a dynamic damper when vibration in the horizontal direction is applied to the vehicular seat.

In the vehicular seat according to another aspect of the invention, the energizing means are elastic bodies that are disposed between the support body and the headrest support and elastically deform during the rotation.

In the vehicular seat according to this aspect of the invention, when the headrest support rotates with respect to the support body, the elastic bodies disposed between both elastically deform. Thus, the headrest support can be energized toward a predetermined position in its range of rotation with respect to the support body, so the energizing means can be given a simple configuration.

In the vehicular seat pertaining to another aspect of the invention, the energizing means are elastic portions that are disposed on the headrest support and elastically deform during the rotation.

In the vehicular seat according to this aspect of the invention, when the headrest support rotates with respect to the support body, the elastic portions disposed on the headrest support elastically deform. Thus, the headrest support can be energized toward a predetermined position in its range of rotation with respect to the support body. In this manner, the elastic portions configuring the energizing means are disposed on the headrest support, so the number of parts can be reduced.

In the vehicular seat pertaining to another aspect of the invention, the headrest support is configured to be rotatable about an axis in a left-right direction of the seatback with respect to the support body, and at least one of a lower end side of the headrest support and a lower end side of the leg portion is configured as a load input portion for receiving a load inputted from a front side of the seatback and is placed further on a lower side of the seatback than the support body.

In the vehicular seat according to this aspect of the invention, at least one of the lower end side of the headrest support and the lower end side of the leg portion is placed further on the lower side of the seatback than the support body that is, further on the lower side of the seatback than the rotational center of the headrest with respect to the seatback and is configured as a load input portion. Here, when a load is inputted from the front side of the seatback with respect to the load input portion by the backward inertial movement of a passenger during a rear collision of the vehicle, for example, the load input portion rotates toward the back side of the seatback, and the portion (the body portion of the headrest) further on the upper side than the rotational center of the headrest rotates toward the front side of the seatback. Thus, a so-called active headrest effect can be obtained, so a situation where the passenger experiences whiplash can be suppressed.

In the vehicular seat according to another aspect of the invention, the support body is formed in a cylindrical shape and is placed in a state where its axial direction is along the vertical direction of the seatback, and the headrest support is inserted inside the cylinder of the support body and has an upper side curved surface that slidably touches an upper end of the support body and a lower side curved surface that slidably touches a lower end of the support body.

In the vehicular seat according to this aspect of the invention, the upper side curved surface disposed on the headrest support slidably touches the upper end of the support body and the lower side curved surface disposed on the headrest support slidably touches the lower end of the support body. Thus, rotation of the headrest support about an axis along the horizontal direction of the seatback with respect to the support body is guided, and movement of the headrest support in the vertical direction of the seatback is suppressed. In this manner, the curved surfaces are disposed on the headrest support, so an existing support body (the frame of the seatback) can be used as is.

In the vehicular seat according to another aspect of the invention, the support body is formed in a cylindrical shape and is placed in a state where its axial direction is along the vertical direction of the seatback, with an upper end curved surface being formed on an upper end of the support body and a lower end curved surface being formed on a lower end of the support body, and the headrest support is inserted inside the cylinder of the support body and has an upper side touching portion that slidably touches the upper end curved surface and a lower side touching portion that slidably touches the lower end curved surface.

In the vehicular seat according to this aspect of the invention, the upper side touching portion disposed on the headrest support slidably touches the upper end curved surface formed on the upper end of the support body and the lower side touching portion disposed on the headrest support slidably touches the lower end curved surface disposed on the lower end of the support body. Thus, rotation of the headrest support about an axis along the horizontal direction of the seatback with respect to the support body is guided, and movement of the headrest support in the vertical direction of the seatback is suppressed. In this manner, the curved surfaces are disposed on the support body, so the headrest support can be given a simple configuration.

In the vehicular seat pertaining to another aspect of the invention, the support body is fined in a cylindrical shape and is placed in a state where its axial direction is along the vertical direction of the seatback, with a pair of bearing holes being formed in mutually opposing positions in an inner peripheral portion of the support body, the headrest support is inserted inside the cylinder of the support body and is equipped with a pair of spindles pivotally supported in the pair of bearing holes, and outer peripheral curved surfaces disposed on the pair of spindles slidably touch inner peripheral curved surfaces of the bearing holes.

In the vehicular seat according to this aspect of the invention, the pair of spindles disposed on the headrest support are pivotally supported in the pair of bearing holes formed in the inner peripheral portion of the support body, and the outer peripheral curved surfaces disposed on the pair of spindles slidably touch the inner peripheral curved surfaces of the pair of bearing holes. Thus, rotation of the headrest support about an axis along the horizontal direction of the seatback with respect to the support body is guided, and movement of the headrest support in the vertical direction of the seatback is suppressed. In this manner, the structure uses the spindles and the bearing holes, so the headrest support can be smoothly rotated.

In the vehicular seat according to another aspect of the invention, the support body is formed in a cylindrical shape and is placed in a state where its axial direction is along the vertical direction of the seatback, with a pair of opposing curved surfaces being formed in mutually opposing positions on an inner peripheral portion of the support body, the headrest support is inserted inside the cylinder of the support body, and a pair of convex portions that slidably touch the pair of opposing curved surfaces are disposed on side portions of the headrest support.

In the vehicular seat according to this aspect of the invention, the pair of convex portions disposed on the side portions of the headrest support slidably touch the pair of opposing curved surfaces formed on the inner peripheral portion of the support body. Thus, rotation of the headrest support about an axis along the horizontal direction of the seatback with respect to the support body is guided, and movement of the headrest support in the vertical direction of the seatback is suppressed. In this manner, the pair of convex portions that touch the pair of opposing curved surfaces are disposed on the side portions of the headrest support, so the vertical direction dimension of the headrest support can be shortened.

Effects of the Invention

As described above, in the vehicular seat pertaining to an aspect of the invention, the headrest can be rotated with respect to the seatback, and support strength in the vertical direction of the headrest can be improved.

In the vehicular seat pertaining to another aspect of the invention, a situation where the headrest coupled to the headrest support needlessly rotates with respect to the seatback can be suppressed.

In the vehicular seat pertaining to another aspect of the invention, the energizing means can be given a simple configuration.

In the vehicular seat pertaining to another aspect of the invention, the number of parts can be reduced.

In the vehicular seat pertaining to another aspect of the invention, a situation where the passenger experiences whiplash can be suppressed.

In the vehicular seat pertaining to another aspect of the invention, an existing support body can be used as is.

In the vehicular seat pertaining to another aspect of the invention, the headrest support can be given a simple configuration.

In the vehicular seat pertaining to another aspect of the invention, the headrest support can be smoothly rotated.

In the vehicular seat pertaining to another aspect of the invention, the vertical direction dimension of the headrest support can be shortened.

BEST MODES FOR CARRYING OUT THE INVENTION

First Embodiment

Figure 1:
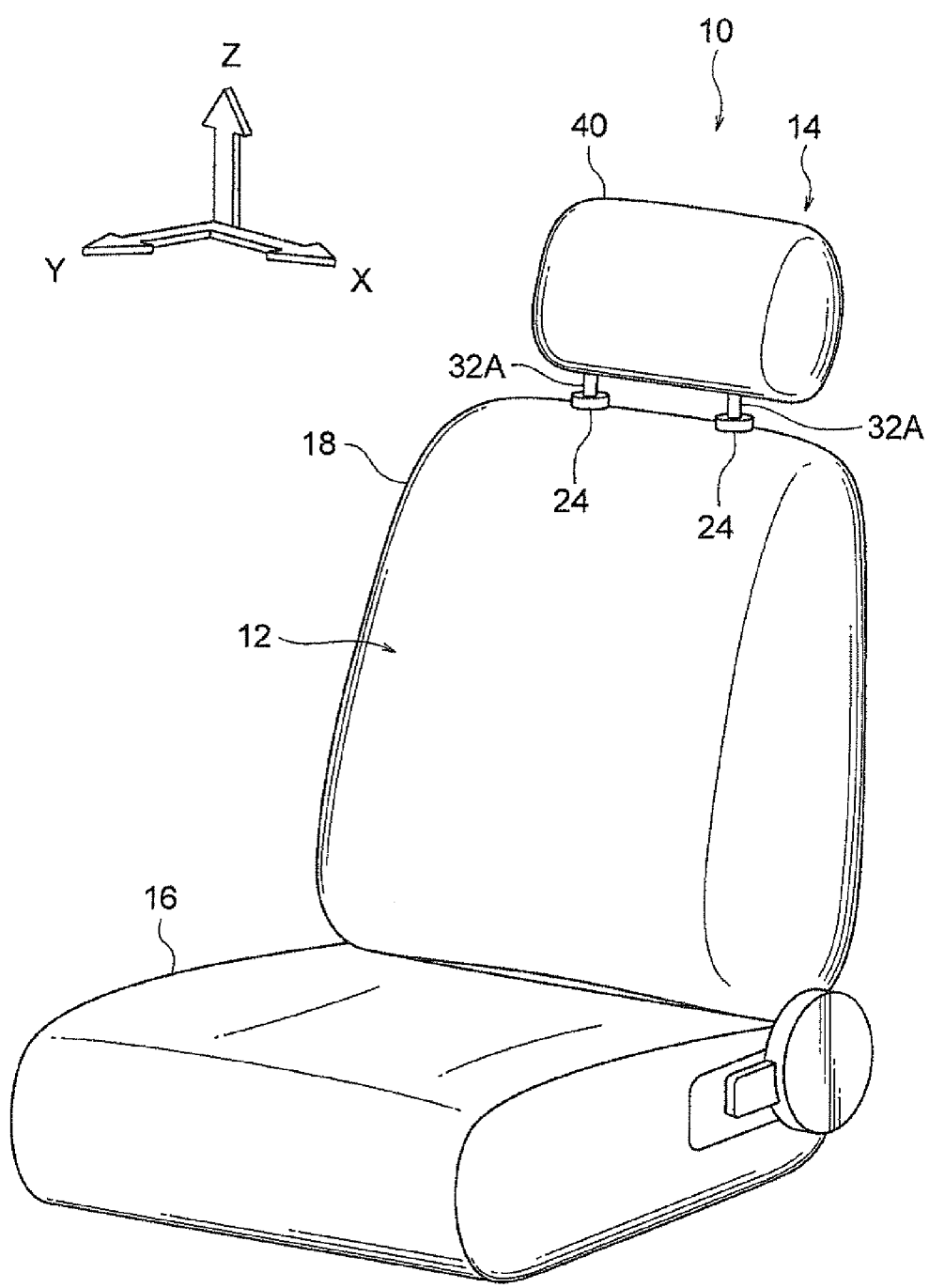
FIG. 1 is a perspective diagram showing a vehicular seat pertaining to a first embodiment of the present invention.

A vehicular seat 10 pertaining to a first embodiment of the present invention will be described below with reference to FIG. 1 to FIG. 10. In the drawings, arrow X represents a left direction of a seatback 18 that configures this vehicular seat 10, arrow Y represents a front direction of the seatback 18, and arrow Z represents an up direction of the seatback 18. Further, the directionalities of front, back, left, right, up, and down in the description below indicate directionalities with respect to the seatback 18.

As shown in FIG. 1, the vehicular seat 10 is equipped with a seat body 12 and a headrest 14. The seat body 12 is configured by a seat cushion 16, which supports the bottom of a seated passenger, and a seatback 18, which supports the back of a seated passenger. The seat cushion 16 is coupled to the floor of an unillustrated vehicle body. Further, a lower end portion of the seatback 18 is coupled to the seat cushion 16 via an unillustrated reclining mechanism.

Figure 2:
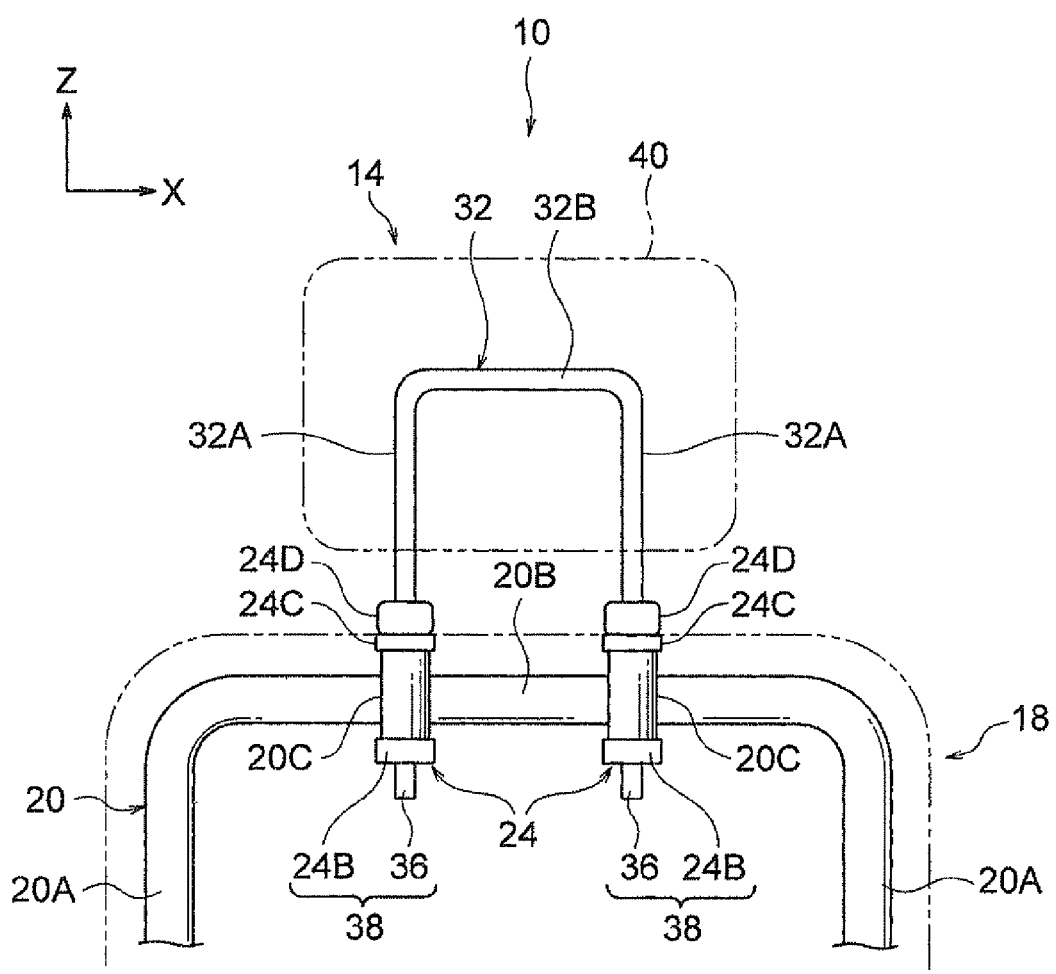
FIG. 2 is a front diagram showing the structure of peripheral members including a headrest frame of the vehicular seat shown in FIG. 1.
Figure 3:
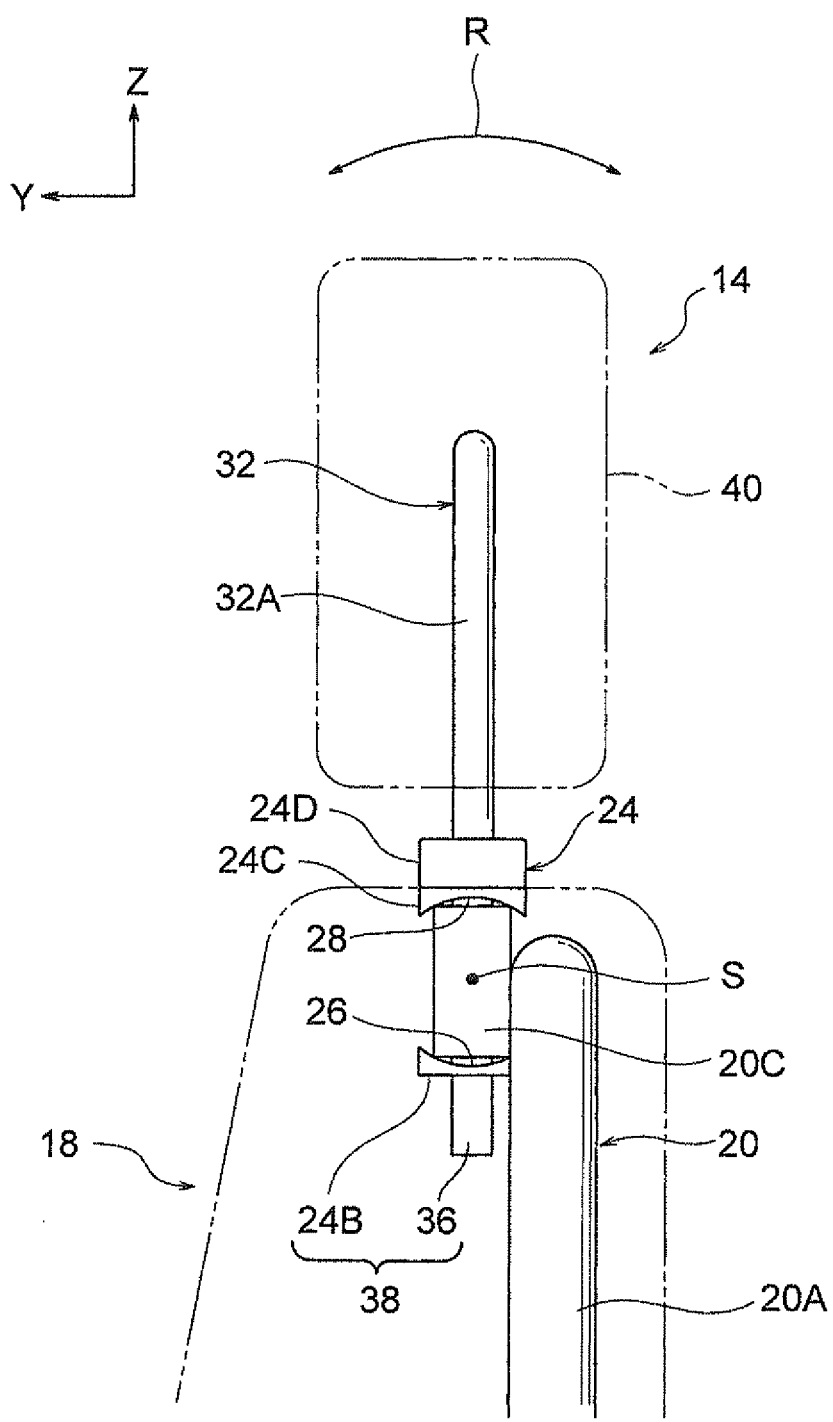
FIG. 3 is a side diagram showing the structure of the peripheral members including the headrest frame of the vehicular seat shown in FIG. 1.

As shown in FIG. 2 and FIG. 3, the seatback 18 is equipped with a seatback frame 20 (frame) that is a skeletal member. The seatback frame 20 is equipped with a pair of left and right side frames 20A that extend in the vertical direction of the seatback 18, an upper cross member 20B that interconnects upper end portions of these side frames 20, and an unillustrated lower cross member that interconnects lower end portions of the side frames 20A.

A pair of left and right support brackets 20C (support bodies) are welded to a front side surface of the upper cross member 20B. These support brackets 20C are formed in square cylinder shapes and are placed in a state where their axial direction is along the vertical direction of the seatback 18. Headrest supports 24 are respectively supported on these support brackets 20C.

Figure 4:
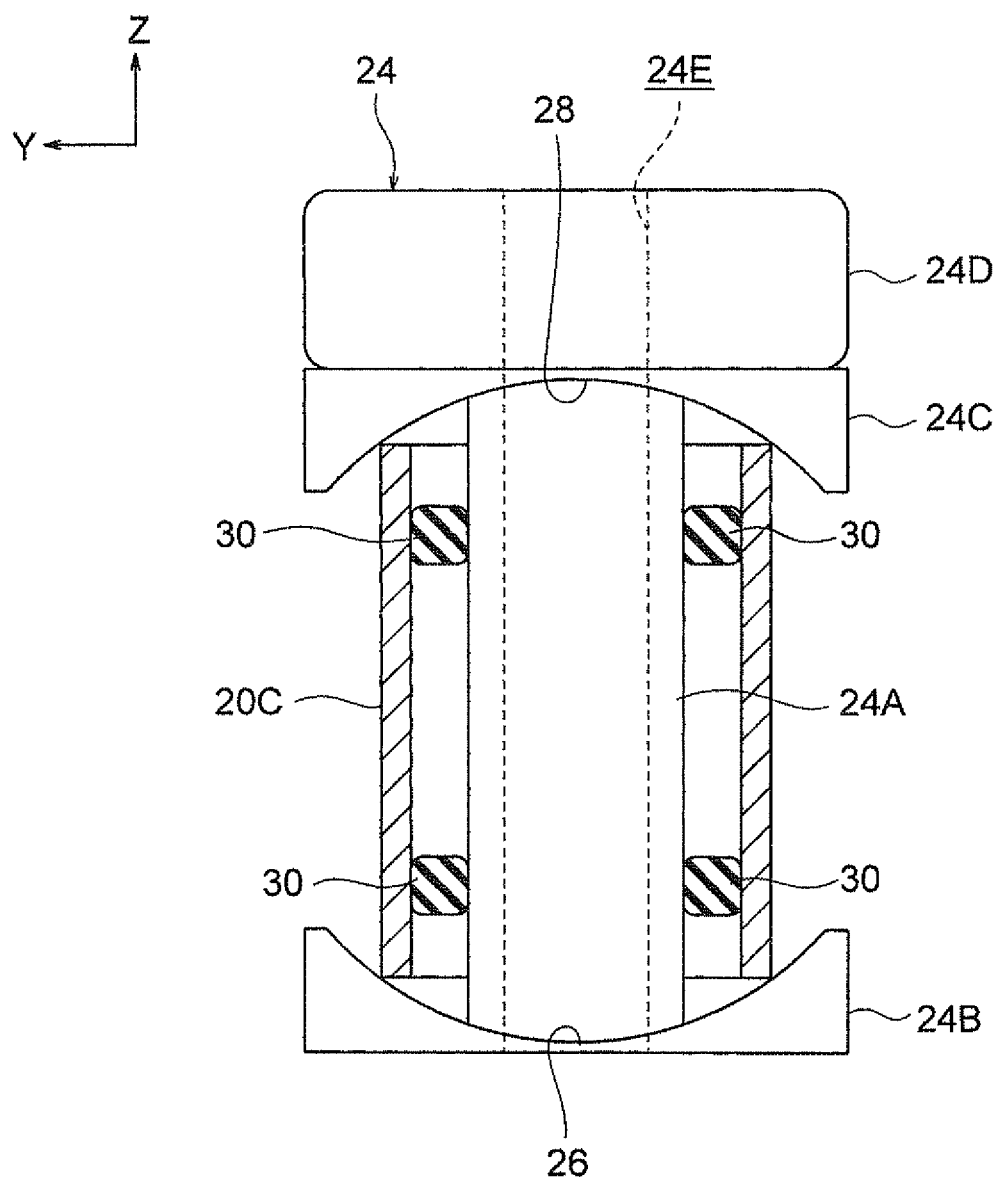
FIG. 4 is a partial cross-sectional diagram showing a headrest support and a support bracket of the vehicular seat shown in FIG. 1 as seen from the left side of a seatback.
Figure 5:
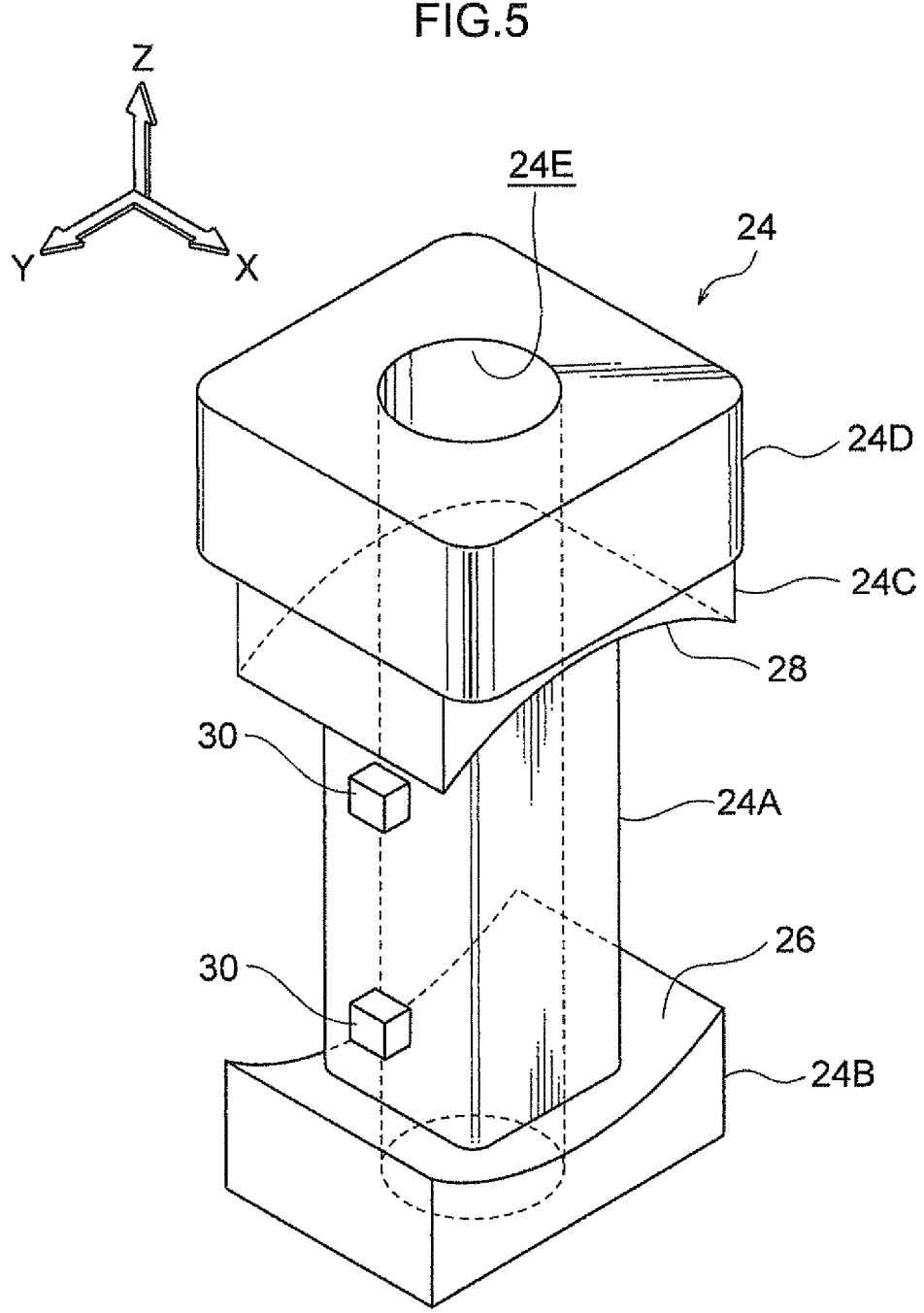
FIG. 5 is a perspective diagram of the headrest support shown in FIG. 4.

As shown in FIG. 4 and FIG. 5, each of the headrest supports 24 is formed in an elongate shape and is equipped with a body portion 24A that is inserted inside (inside the cylinder) of the support bracket 20C, a lower guide portion 24B that is disposed on a lower end side of this body portion 24A, an upper guide portion 24C that is disposed on an upper end side of the body portion 24A, and a lock portion 24D that is disposed on an upper side of the upper guide portion 24C. Further, a through hole 24E that penetrates the headrest support 24 in its longitudinal direction (the vertical direction of the seatback 18) is formed in this headrest support 24.

A lower side curved surface 26 is formed on an upper portion of the lower guide portion 24B. This lower side curved surface 26 is formed in a circular cylinder surface shape centering on an axis along the left-right direction of the seatback 18 and slidably touches a lower end of the support bracket 20C. Further, an upper side curved surface 28 is formed on a lower portion of the upper guide portion 24C. This upper side curved surface 28 is formed in a circular cylinder surface shape concentric with the lower side curved surface 26 and slidably touches an upper end of the support bracket 20C.

Figure 6:
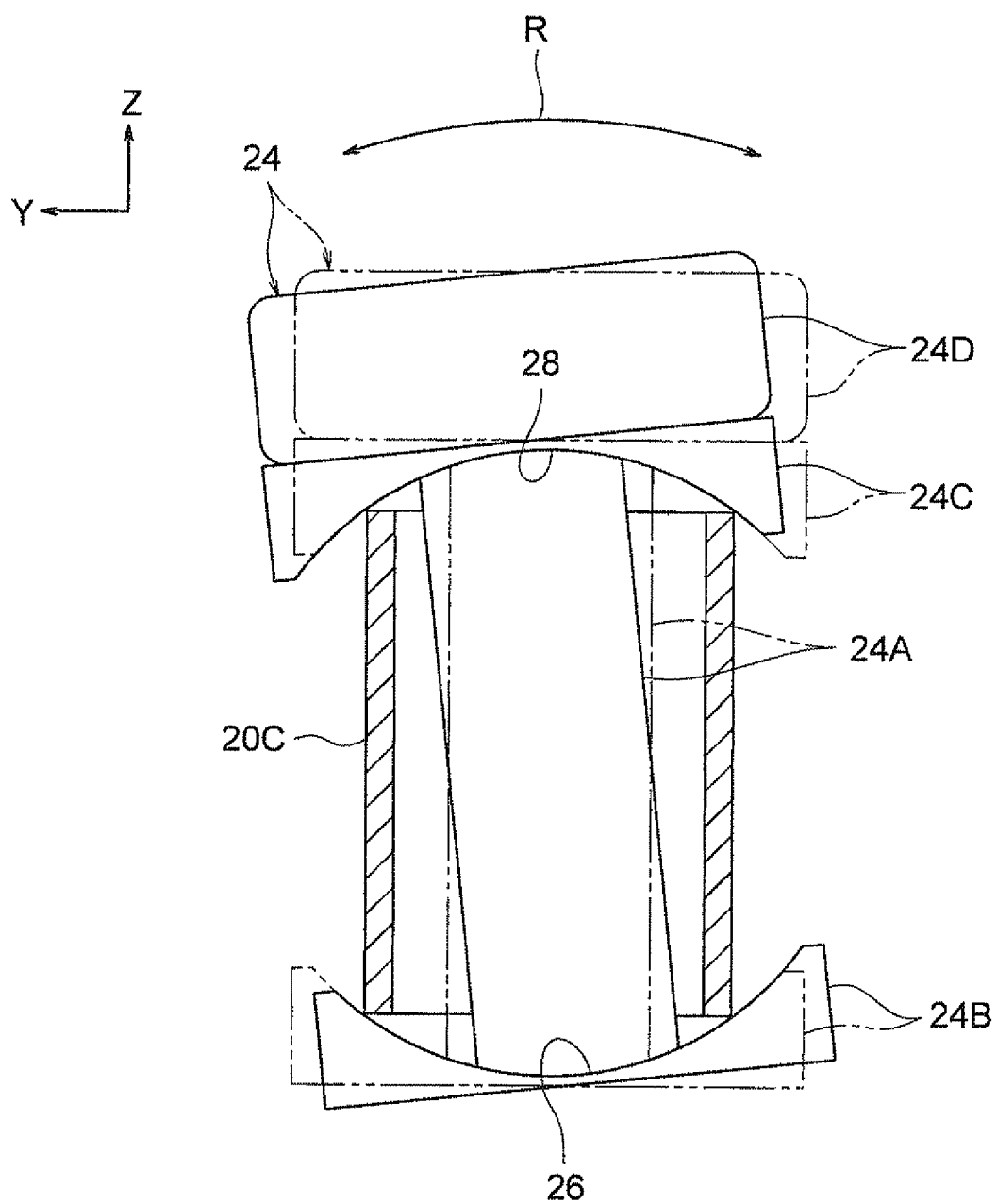
FIG. 6 is a partial cross-sectional diagram for describing a state where the headrest support shown in FIG. 4 has relatively rotated with respect to the support bracket.

Thus, the lower side curved surface 26 slides on the lower end of the support bracket 20C and the upper side curved surface 28 slides on the upper end of the support bracket 20C, whereby rotation of the headrest support 24 about an axis along the left-right direction of the seatback 18 with respect to the support bracket 20C is guided (see FIG. 6).

Further, the lower side curved surface 26 touches the lower end of the support bracket 20C and the upper side curved surface 28 touches the upper end of the support bracket 20C, whereby movement of the headrest support 24 in the vertical direction of the seatback 18 with respect to the support bracket 20C is suppressed.

As shown in FIG. 4, plural (here, two each on the left and right) rubber members 30 serving as elastic members are disposed on both the front and back sides of the body portion 24A inside the support bracket 20C (the rubber members 30 are not shown in FIG. 6). These rubber members 30 are formed in square column shapes (block shapes) and contact the inner peripheral surface of the support bracket 20C and the outer peripheral surface of the body portion 24A. Thus, the headrest support 24 is energized toward an intermediate position in its range of rotation with respect to the support bracket 20C (the position shown in FIG. 3) and is ordinarily held in the intermediate position. Additionally, the rubber embers 30 elastically deform when an external force is applied to the headrest support 24, whereby rotation of the headrest support 24 with respect to the support bracket 20C is allowed.

In other embodiments, other types of elastic bodies can also be used instead of the rubber members 30. Further, the number and the shape of the rubber members 30 (elastic bodies) can be appropriately changed. Further, the vehicular seat may also be given a configuration where, for example, elastically deformable elastic portions (tongue pieces, etc.) are integrally formed on the outer peripheral portion of the body portion 24A of the headrest support 24 and these elastic portions are made to touch the inner peripheral surface of the support bracket 20C, whereby the elastic portions energize the headrest support 24 toward an intermediate position in its range of rotation with respect to the support bracket 20C. In this case, the rubber members 30 (elastic members) can be omitted, so the number of parts can be reduced.

A headrest frame 32 disposed in the headrest 14 is coupled to the headrest supports 24 having the configuration described above (see FIG. 2 and FIG. 3). The headrest frame 32 is equipped with a pair of left and right leg portions 32A, which extend in the vertical direction of the seatback 18, and an intermediate portion 32B, which interconnects upper end portions of the pair of left and right leg portions 32A.

The pair of leg portions 32A are respectively inserted into the through holes 24E in the headrest supports 24 from their lower end sides, and relative movement of the leg portions 32A in their axial direction with respect to the headrest supports 24 is regulated by unillustrated lock members disposed in the lock portions 24D of the headrest supports 24. Thus, the pair of leg portions 32A of the headrest frame 32 are coupled to the seatback frame 20 via the headrest supports 24.

Here, as mentioned above, the headrest supports 24 are configured to be rotatable about an axis along the left-right direction of the seatback 18 with respect to the seatback frame 20. For this reason, the pair of leg portions 32A (the headrest frame 32) coupled to the seatback frame 20 via the headrest supports 24 are configured to be rotatable (capable of pendulum motion) about an axis along the left-right direction of the seatback 18 with respect to the seatback frame 20. Further, as mentioned above, the headrest supports 24 are energized toward an intermediate position in their range of rotation with respect to the support brackets 20C by the plural rubber embers 30. For this reason, the headrest frame 32 is ordinarily held in the intermediate position shown in FIG. 3.

A body portion 40 of the headrest 14 is mounted on the headrest frame 32 having the configuration described above. This body portion 40 is configured such that its main portion is a cushion member covered by an outer covering. This body portion 40 is configured to rotate forward and backward with respect to the seatback 18 together with the headrest frame 32 (see arrow R in FIG. 3) and is ordinarily held in an intermediate position in its range of rotation. In the present first embodiment, by setting the spring constant of the rubber members 30 in consideration of the mass of the headrest 14, the resonance frequency in the anteroposterior direction of the headrest 14 is set so as to substantially match the resonance frequency in the anteroposterior direction of the seat body 12.

Further, in the present first embodiment, as shown in FIG. 2 and FIG. 3, lower end portions 36 of the pair of leg portions 32A are placed so as to ordinarily project toward the lower sides of the lower guide portions 24B of the headrest supports 24. The lower end portions 36 and the lower guide portions 24B are configured as load input portions 38 that receive a load inputted from the front side of the seatback 18 and are placed further on the lower side of the seatback 18 than the support brackets 20C (that is, further on the lower side of the seatback 18 than rotational centers S of the headrest supports 24 with respect to the support brackets 20C).

Next, the action and effects of the present first embodiment will be described.

In the vehicular seat 10, the upper side curved surfaces 28 slide on the upper ends of the support brackets 20C and the lower side curved surfaces 26 slide on the lower ends of the support brackets 20C, whereby rotation of the headrest supports 24 about an axis along the left-right direction of the seatback 18 with respect to the support bracket 20C is guided.

Here, when vibration in the anteroposterior direction is applied to the vehicular seat 10 by vehicle body vibration when the engine of the vehicle idles, for example, inertial force in the anteroposterior direction acts on the headrest 14. For this reason, because of this inertial force, the headrest supports 24 rotate with respect to the support brackets 20C while causing the plural rubber members 30 to elastically deform. Thus, the headrest 14 rotates (undergoes pendulum motion) forward and backward with respect to the seatback 18. At this time, the elastic force (resilience) of the plural rubber members 30 acts in a direction where it pushes back the swing of the upper portion of the seatback 18, so vibration of the seat body 12 is suppressed by the elastic force of these rubber members 30. That is, in this vehicular seat 10, the headrest 14 functions as a dynamic damper, whereby vibration in the anteroposterior direction of the seat body 12 is reduced.

Moreover, in this vehicular seat 10, the upper side curved surfaces 28 touch the upper ends of the support brackets 20C and the lower side curved surfaces 26 touch the lower ends of the support brackets 20C, and movement of the headrest supports 24 in the vertical direction of the seatback 18 with respect to the support brackets 20C is suppressed. Thus, support strength in the vertical direction of the headrest 14 with respect to the seatback 18 is sufficiently ensured. Consequently, a drop in merchantability due to insufficient support strength in the vertical direction of the headrest 14 or rattling can be avoided. Moreover, in this vehicular seat 10, the upper side curved surfaces 28 and the lower side curved surfaces 26 are disposed in the headrest supports 24, so existing support brackets 20C (seatback frame 20) can be used, which is preferred.

Further, in this vehicular seat 10, as mentioned above, the headrest 14 rotates (undergoes pendulum motion) forward and backward with respect to the seatback 18. For this reason, as compared to when the headrest 14 undergoes translational motion (relatively moves in a straight line) forward and backward with respect to the seatback 18, the amount of relative displacement of the headrest 14 with respect to the seatback 18 is set large, and the effect that the headrest 14 exhibits as a dynamic damper increases.

Figure 7A:
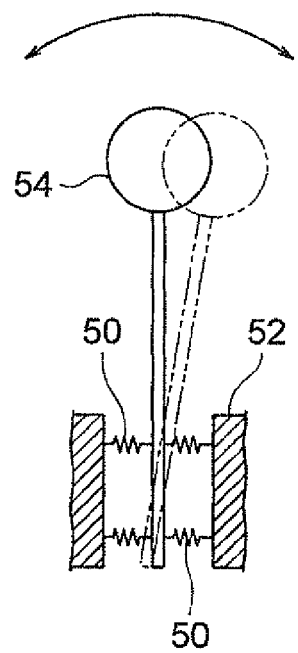
FIG. 7A is a conceptual diagram showing a dynamic damper of pendulum motion.
Figure 7B:
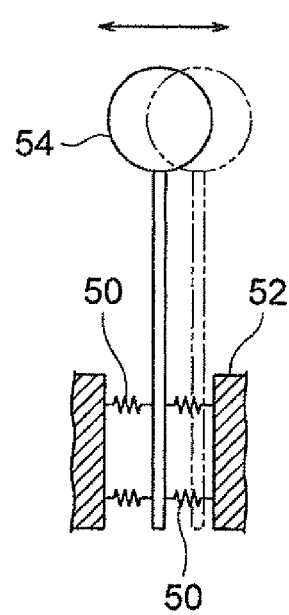
FIG. 7B is a conceptual diagram showing a dynamic damper of translational motion.

That is, as shown in FIG. 7A and FIG. 7B, when a weight 54 supported on support members 52 via elastic bodies 50 (here, springs) is relatively moved with respect to the support members 52, in the pendulum motion shown in FIG. 7A, a moment is added to the support members 52, so the mass effect of the weight 54 becomes greater than the translational motion shown in FIG. 7B.

Figure 8A:
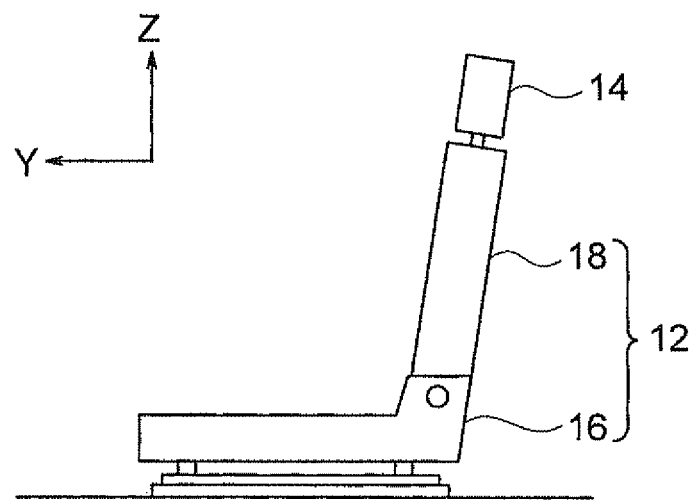
FIG. 8A is a general side diagram of the vehicular seat pertaining to the first embodiment.
Figure 8B:
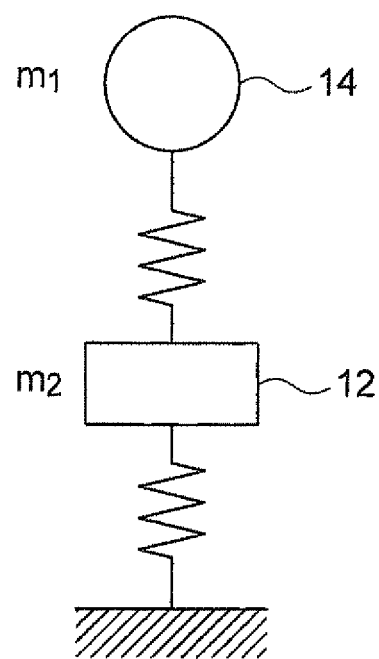
FIG. 8B is a conceptual diagram for describing the mass effect of the vehicular seat shown in FIG. 8A.
Figure 9:
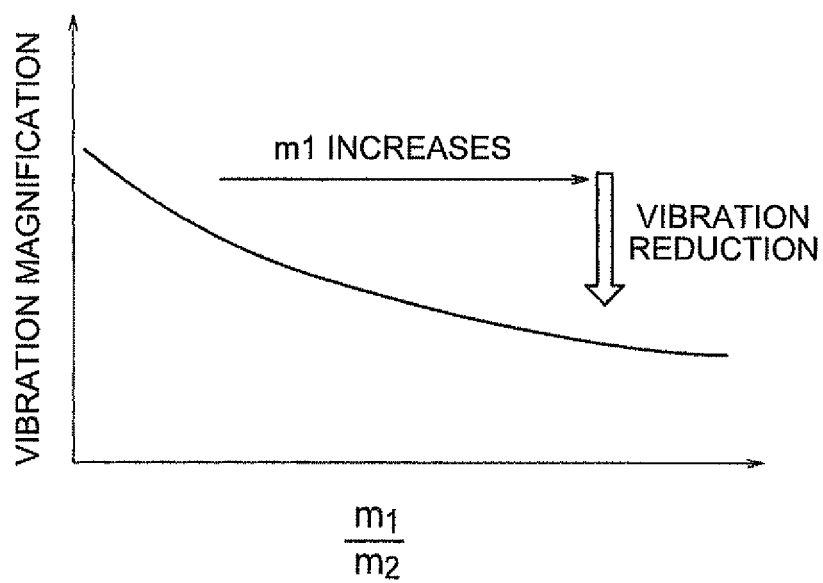
FIG. 9 is a line diagram showing the relationship between the equivalent mass of a headrest and a seat body and vibration magnification of the seat body.

Further, as shown in FIG. 8A and FIG. 8B, when m1 represents the equivalent mass of the headrest 14 and m2 represents the mass of the seat body 12, as shown in FIG. 9, vibration magnification of the seat body 12 is reduced by making m1 larger (the vibration reducing effect resulting from the mass of the dynamic damper becomes larger).

Consequently, in a configuration where the headrest 14 undergoes rotational motion (pendulum motion) with respect to the seatback 18 like in the present vehicular seat 10, the mass effect of the headrest 14 becomes larger and vibration of the seat body 12 is effectively reduced.

Figure 10:
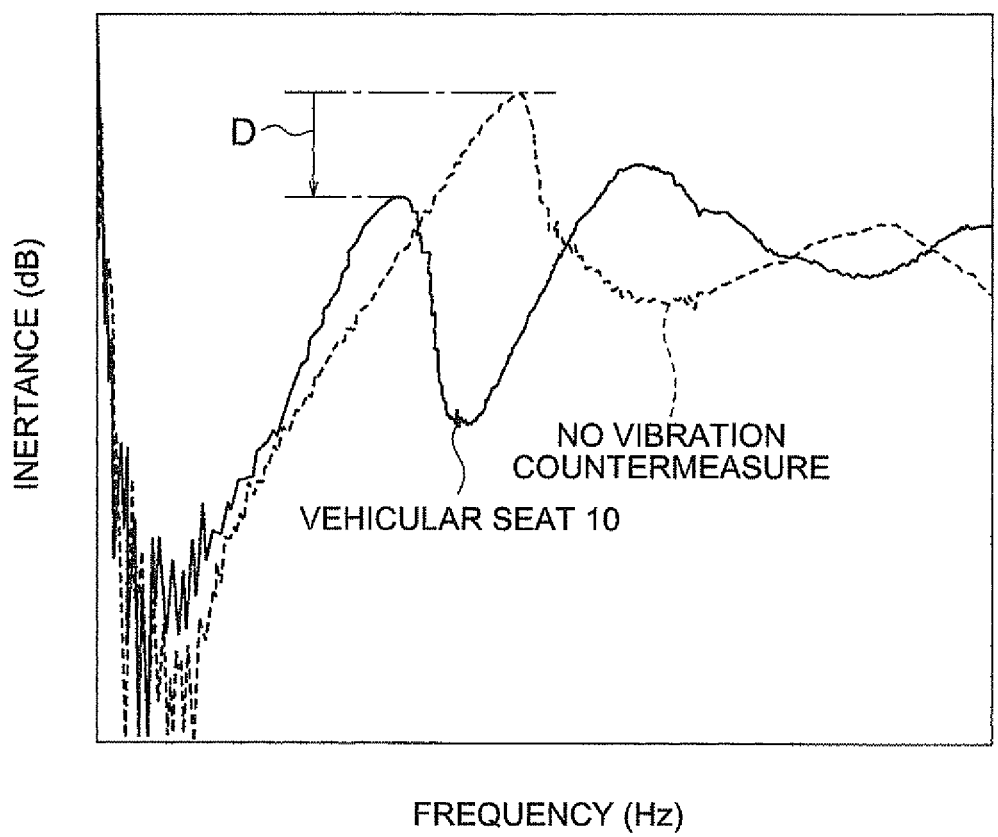
FIG. 10 is a line diagram showing actual measurement results of vibration levels of vehicular seats.

In FIG. 10, actual measurement results of vibration levels of vehicular seats (the relationship between frequency and inertance) are shown in a line diagram. In FIG. 10, the dotted line represents the vibration level of a common vehicular seat to which a vibration countermeasure has not been administered. Further, in FIG. 10, the solid line represents the vibration level of the present vehicular seat 10. From FIG. 10, it is understood that, in the present vehicular seat 10, the vibration reducing effect is larger as compared to the vehicular seat to which a vibration countermeasure has not been administered (see arrow D in FIG. 10).

Moreover, in this vehicular seat 10, when a load is inputted from the front side of the seatback 18 with respect to the load input portions 38 shown in FIG. 2 and FIG. 3 by the backward inertial movement of a seated passenger during a rear collision of the vehicle, for example, the load input portions 38 rotate toward the back side of the seatback 18, and the body portion 40 of the headrest 14 rotates toward the front side of the seatback 18. Thus, a so-called active headrest effect can be obtained, so a situation where the passenger experiences whiplash can be suppressed. Further, ordinarily the headrest 14 is held in an intermediate position in its range of rotation with respect to the seatback 18 by the elastic force of the rubber members 30, so a situation where the headrest 14 needlessly rotates with respect to the seatback 18 can be suppressed.

In the first embodiment described above, the invention is given a configuration where rotation of the headrest supports 24 about an axis along the left-right direction of the seatback 18 with respect to the support brackets 20C is guided, but the present invention is not limited to this and may also be given a configuration where rotation of the headrest supports 24 about an axis along the anteroposterior direction of the seatback 18 with respect to the support brackets 20C is guided.

Next, other embodiments of the present invention will be described. In regard to configurations and action that are basically the same as those in the first embodiment, reference numerals that are the same as those in the first embodiment will be given thereto and description thereof will be omitted.

Second Embodiment

Figure 11A:
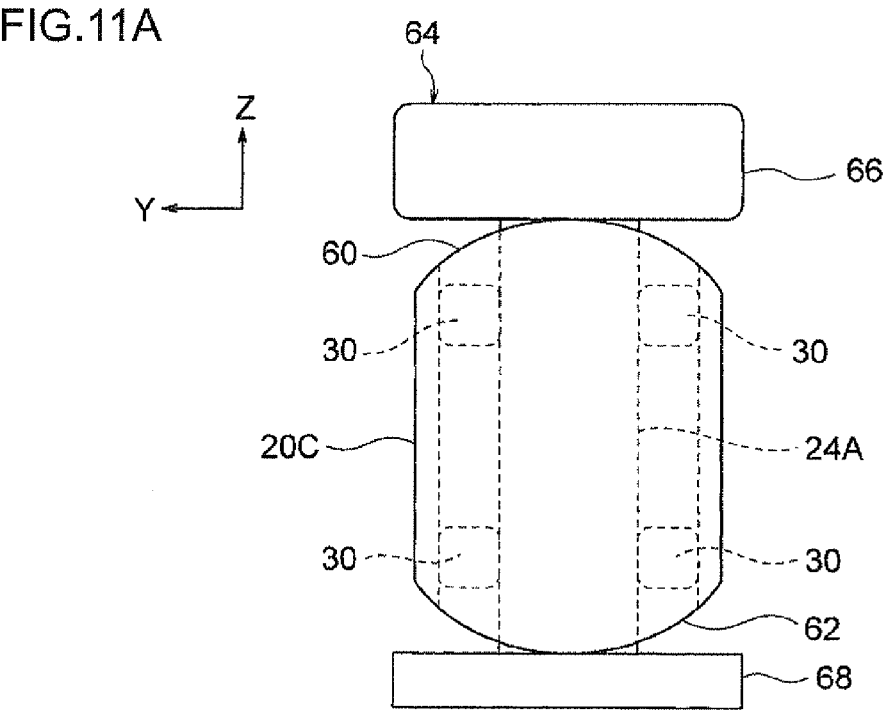
FIG. 11A is a side diagram showing a headrest support and a support bracket of a vehicular seat pertaining to a second embodiment of the present invention as seen from the left side of the seatback.
Figure 11B:
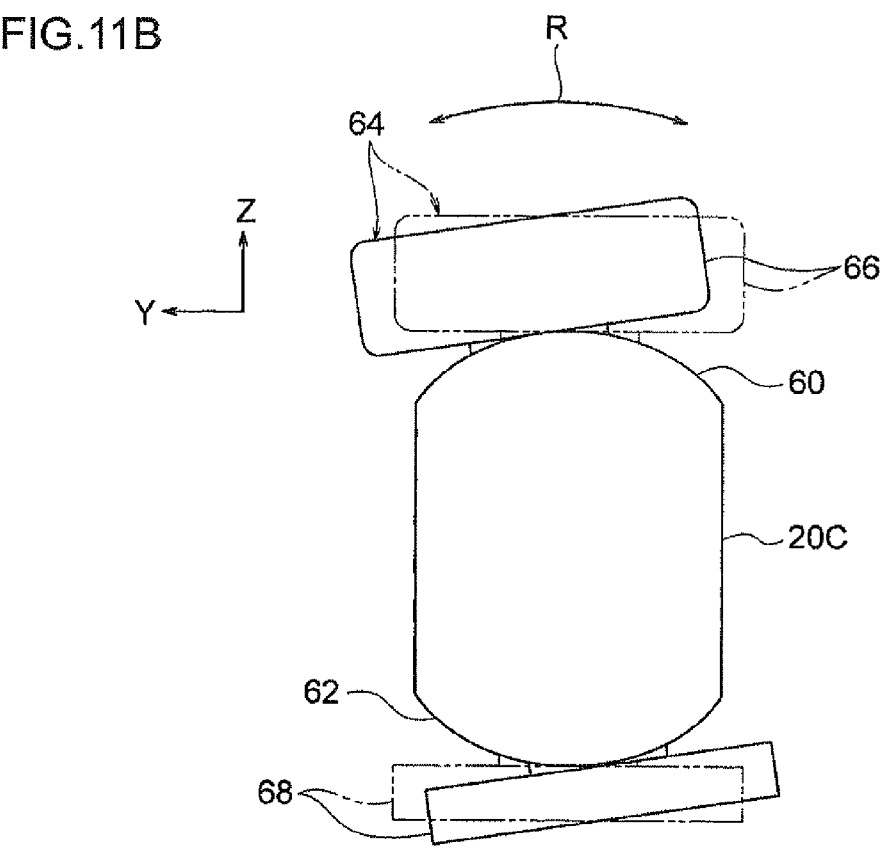
FIG. 11B is a side diagram showing a state where the headrest support shown in FIG. 11A has relatively rotated with respect to the support bracket.
Figure 12:
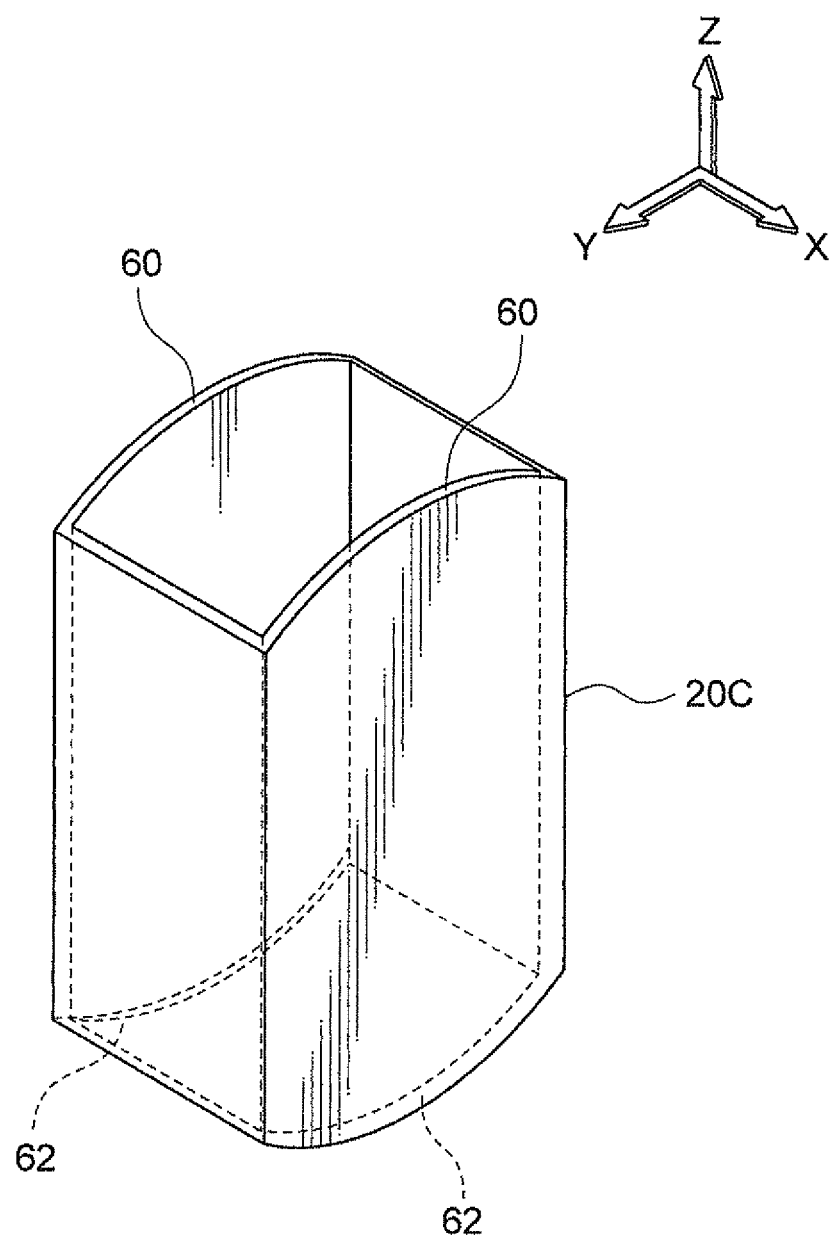
FIG. 12 is a perspective diagram of the support bracket shown in FIG. 11.

In FIG. 11A and FIG. 11B, a partial configuration of a vehicular seat pertaining to a second embodiment of the present invention is shown in general partial cross-sectional diagrams. This embodiment is given basically the same configuration as that of the first embodiment, except that in this embodiment an upper end curved surface 60 is formed on the upper end portion of the support bracket 20C (see FIG. 12). This upper end curved surface 60 is formed in a circular cylinder surface shape centering on an axis along the left-right direction of the seatback 18. Further, a lower end curved surface 62 is formed on the lower end portion of the support bracket 20C. This lower end curved surface 62 is formed in a circular cylinder surface shape concentric with the upper end curved surface 60.

Further, in this embodiment, the configuration of a headrest support 64 differs from that of the headrest support 24 pertaining to the first embodiment. This headrest support 64 is, like the headrest support 24 pertaining to the first embodiment, equipped with the body portion 24A inserted inside the cylinder of the support bracket 20C. An upper side touching portion 66 is integrally disposed on the upper end portion of the body portion 24A. This upper side touching portion 66 is given the same configuration as that of the lock portion 24D pertaining to the first embodiment, and a lower surface thereof formed in a planar shape slidably touches the upper end curved surface 60 of the support bracket 20C. Further, a lower side touching portion 68 is disposed on the lower end portion of the body portion 24A. As for this lower side touching portion 68, an upper surface thereof formed in a planar shape slidably touches the lower end curved surface 62 of the support bracket 20C.

In this embodiment, the upper side touching portion 66 of the headrest support 64 slides on the upper end curved surface 60 of the support bracket 20C and the lower side touching portion 68 of the headrest support 64 slides on the lower end curved surface 62 of the support bracket 20C, whereby rotation of the headrest support 64 about an axis along the left-right direction of the seatback 18 with respect to the support bracket 20C is guided. Further, the upper side touching portion 66 touches the upper end curved surface 60 and the lower side touching portion 68 touches the lower end curved surface 62, whereby movement of the headrest support 64 in the vertical direction of the seatback 18 with respect to the support bracket 20C is suppressed. Consequently, the same action and effects as the first embodiment are achieved. Moreover, because the upper end curved surface 60 and the lower end curved surface 62 are disposed on the support bracket 20C, it is not necessary to disposed curved surfaces on the headrest support 64. Consequently, the headrest support 64 can be given a simple configuration.

Third Embodiment

Figure 13A:
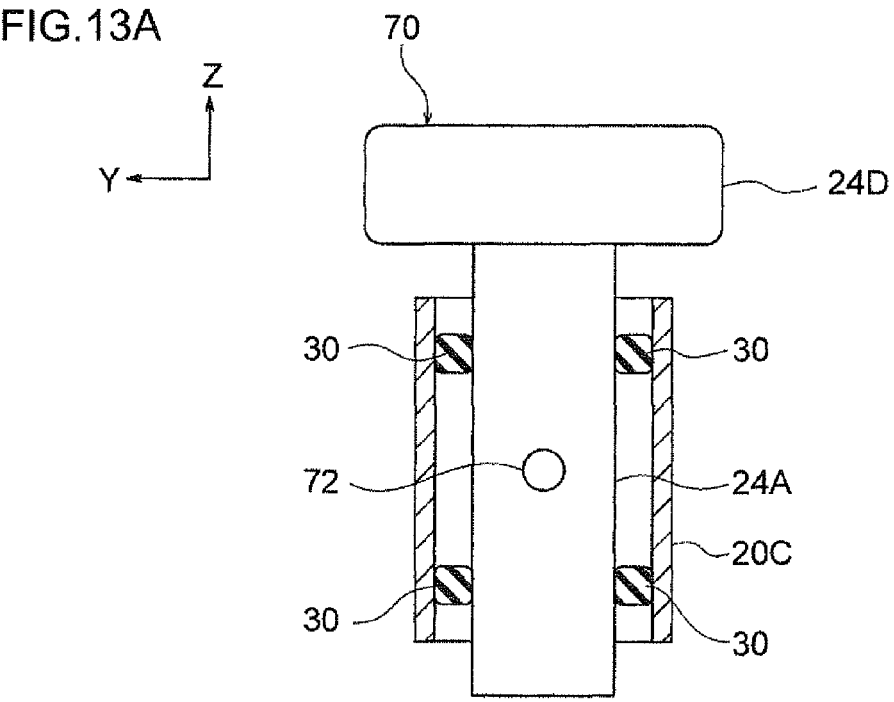
FIG. 13A is a partial cross-sectional diagram showing a headrest support and a support bracket of a vehicular seat pertaining to a third embodiment of the present invention as seen from the left side of the seatback.
Figure 13B:
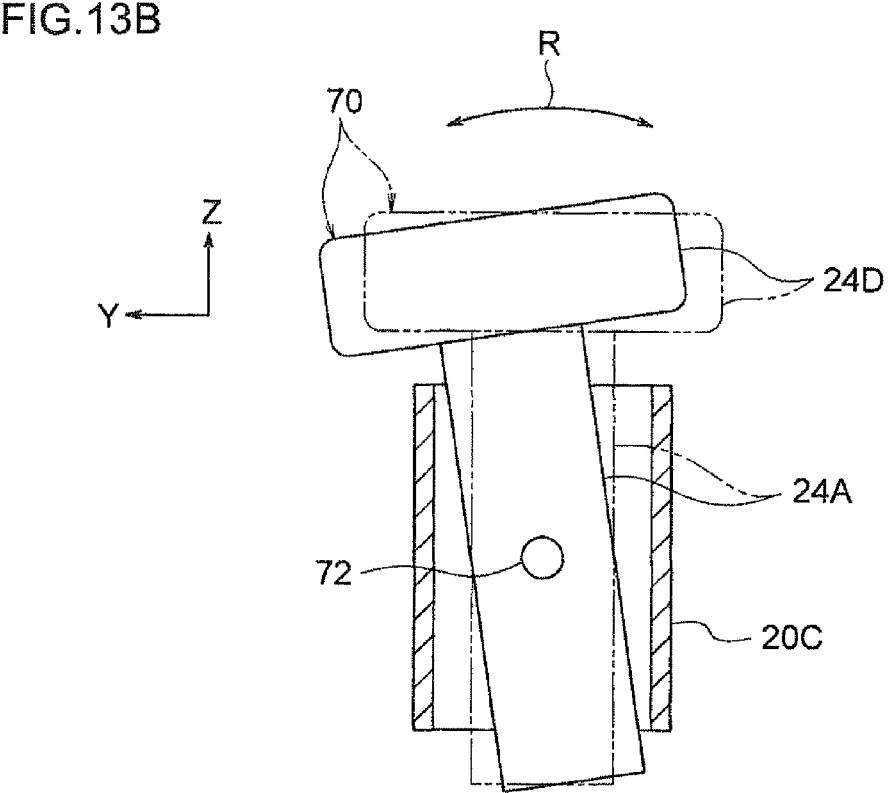
FIG. 13B is a partial cross-sectional diagram showing a state where the headrest support shown in FIG. 13A has relatively rotated with respect to the support bracket.

In FIG. 13A and FIG. 13B, a partial configuration of a vehicular seat pertaining to a third embodiment of the present invention is shown in general partial cross-sectional diagrams. In FIG. 13B, illustration of the rubber members 30 is omitted for convenience of description. This embodiment is given basically the same configuration as that of the first embodiment, except that in this embodiment the configuration of a headrest support 70 differs from that of the headrest support 24 pertaining to the first embodiment.

Figure 14:
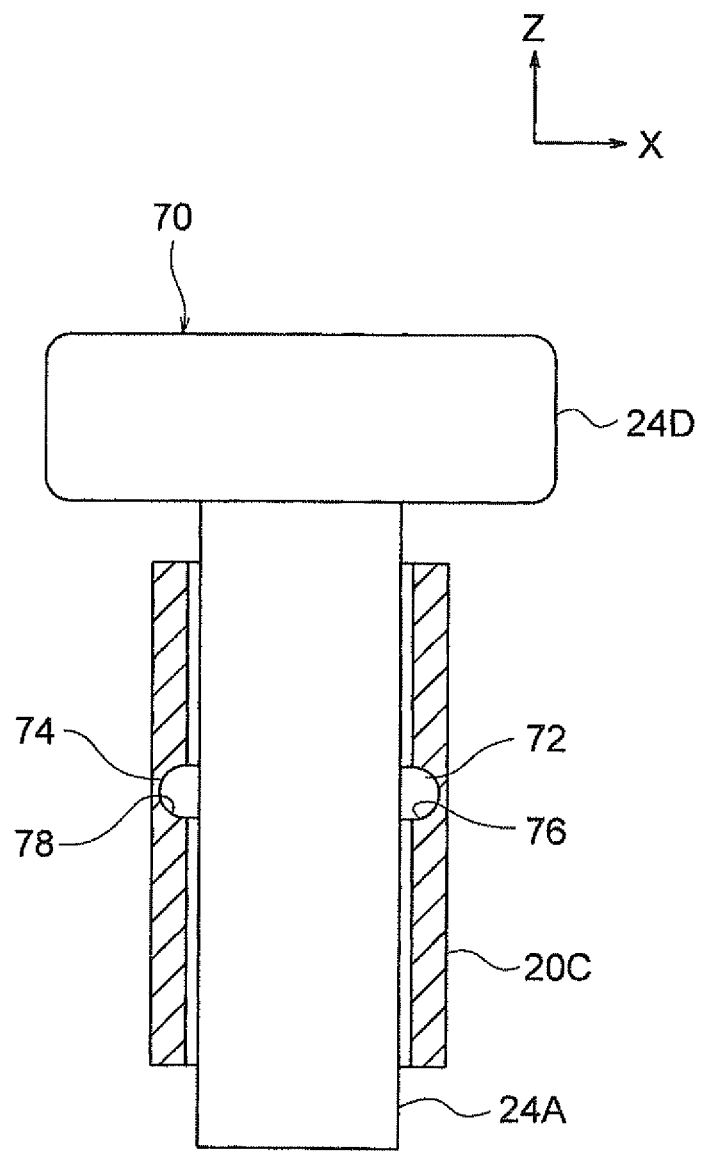
FIG. 14 is a partial cross-sectional diagram showing the headrest support and the support bracket shown in FIG. 13A as seen from the front side of the seatback.
Figure 15:
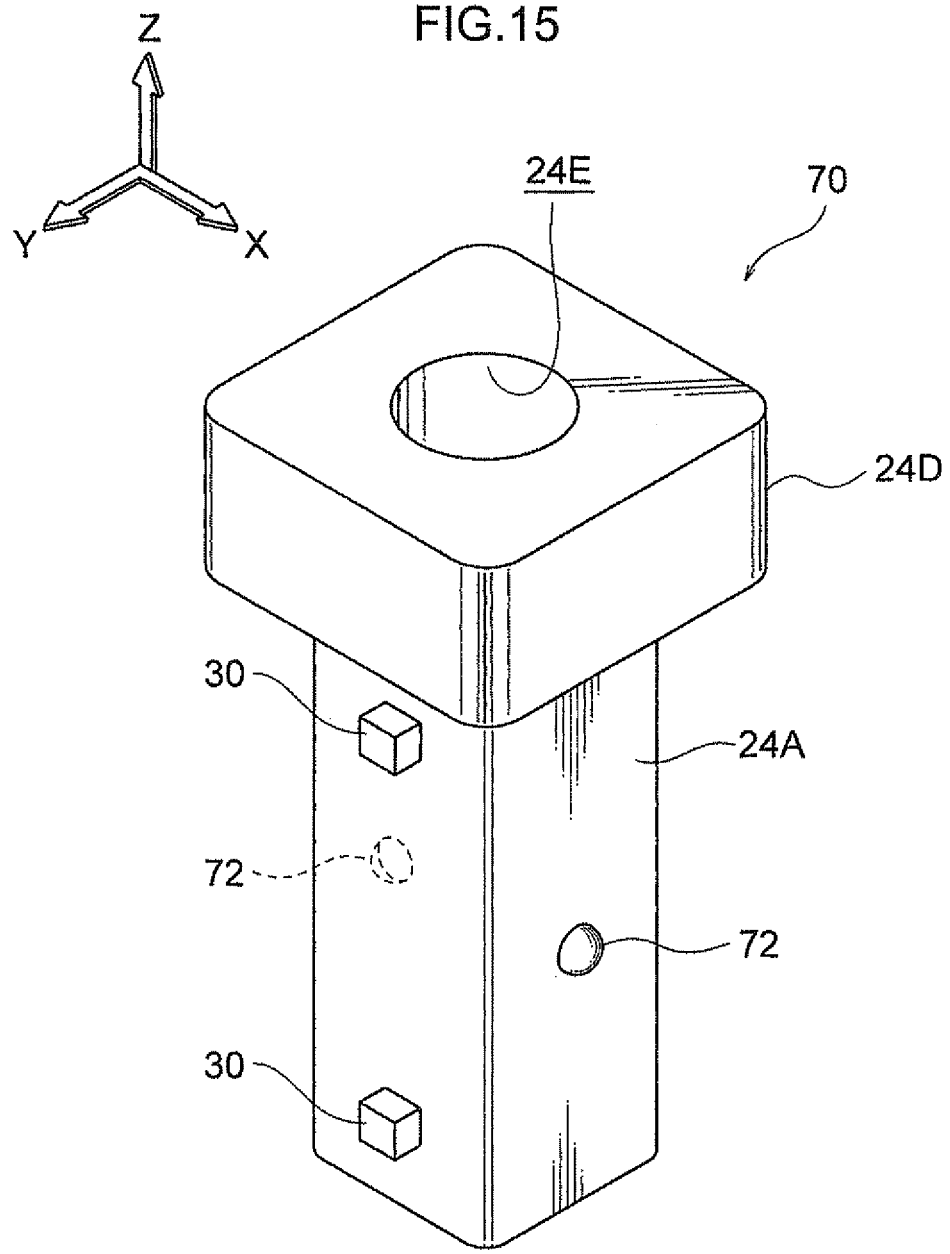
FIG. 15 is a perspective diagram of the headrest support shown in FIG. 13A.

This headrest support 70 is, like the headrest support 24 pertaining to the first embodiment, equipped with the body portion 24A and the lock portion 24D, but the lower guide portion 24B and the upper guide portion 24C are omitted. Instead, as shown in FIG. 14, a pair of spindles 72 and 74 are disposed on the body portion 24A of this headrest support 70. The one spindle 72 is disposed on the left side surface of the body portion 24A, and the other spindle 74 is disposed on the right side surface of the body portion 24A. These spindles 72 and 74 are placed in a state where their axial direction is along the left-right direction of the seatback 18, and distal end portions of the spindles 72 and 74 are formed in spherical shapes (see FIG. 15).

Further, in this embodiment, as shown in FIG. 14, a pair of bearing holes 76 and 78 are disposed in mutually opposing positions in an inner peripheral portion of the support bracket 20C. The one spindle 72 of the headrest support 70 is pivotally supported such that it may freely rotate in the one bearing hole 76, and an outer peripheral curved surface (spherical surface) of this spindle 72 slidably touches an inner peripheral curved surface (spherical surface) of the bearing hole 76. Further, the other spindle 74 of the headrest support 70 is pivotally supported such that it may freely rotate in the other bearing hole 78, and an outer peripheral curved surface (spherical surface) of this spindle 74 slidably touches an inner peripheral curved surface (spherical surface) of the bearing hole 78.

In this embodiment, the outer peripheral curved surfaces of the spindles 72 and 74 slide on the inner peripheral surfaces of the bearing holes 76 and 78, whereby rotation of the headrest support 70 about an axis along the horizontal direction of the seatback 18 with respect to the support bracket 20C is guided. Further, the outer peripheral curved surfaces of the spindles 72 and 74 touch the inner peripheral curved surfaces of the bearing holes 76 and 78, whereby movement of the headrest 70 in the vertical direction of the seatback 18 is suppressed. Consequently, the same action and effects as the first embodiment are achieved. Moreover, because the structure uses the spindles 72 and 74 and the bearing holes 76 and 78, the headrest support 70 can be smoothly rotated with respect to the support bracket 20C.

Fourth Embodiment

Figure 16A:
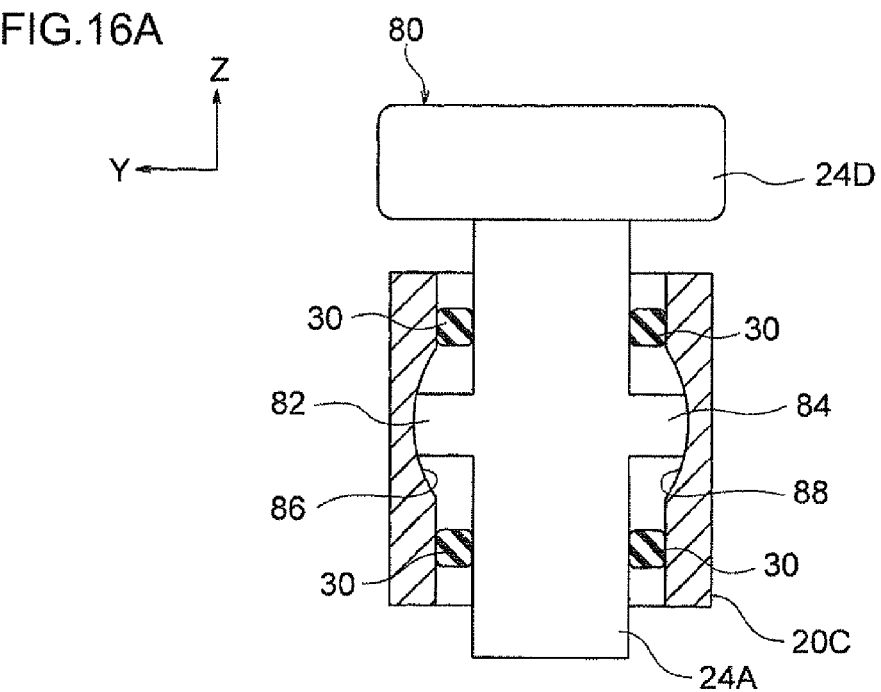
FIG. 16A is a partial cross-sectional diagram showing a headrest support and a support bracket of a vehicular seat pertaining to a fourth embodiment of the present invention as seen from the left side of the seatback.
Figure 16B:
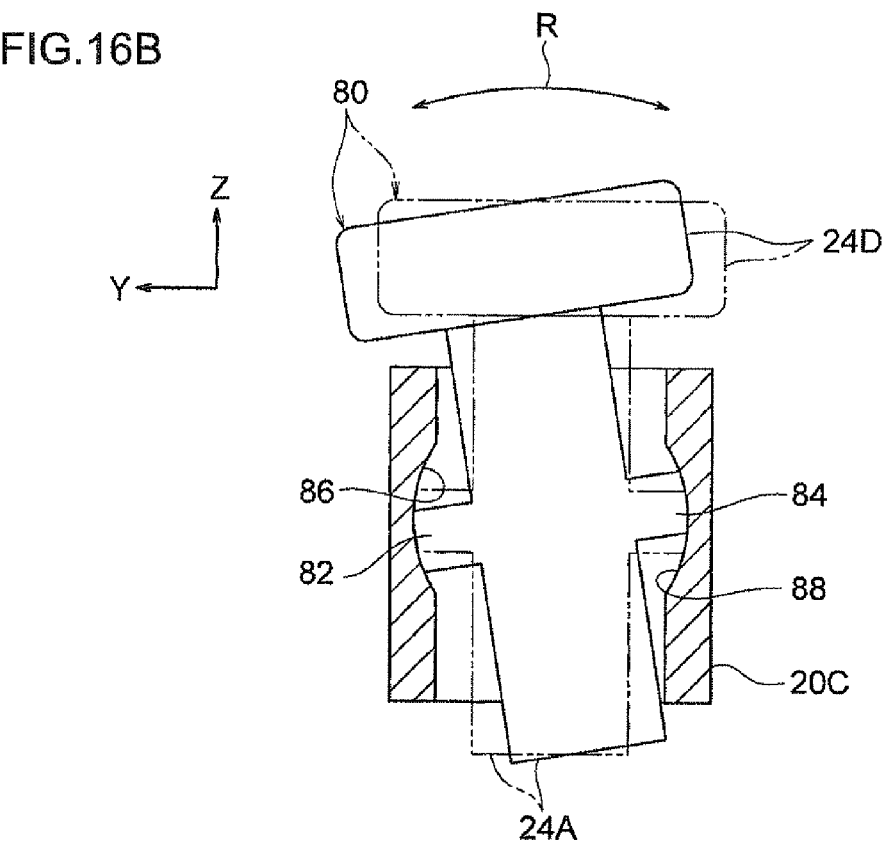
FIG. 16B is a partial cross-sectional diagram showing a state where the headrest support shown in FIG. 16A has relatively rotated with respect to the support bracket.

In FIG. 16A and FIG. 16B, a partial configuration of a vehicular seat pertaining to a fourth embodiment of the present invention is shown in general partial cross-sectional diagrams. In FIG. 16B, illustration of the rubber members 30 is omitted for convenience of description. This embodiment is given basically the same configuration as that of the first embodiment, except that in this embodiment the configuration of a headrest support 80 differs from that of the headrest support 24 pertaining to the first embodiment.

Figure 17:
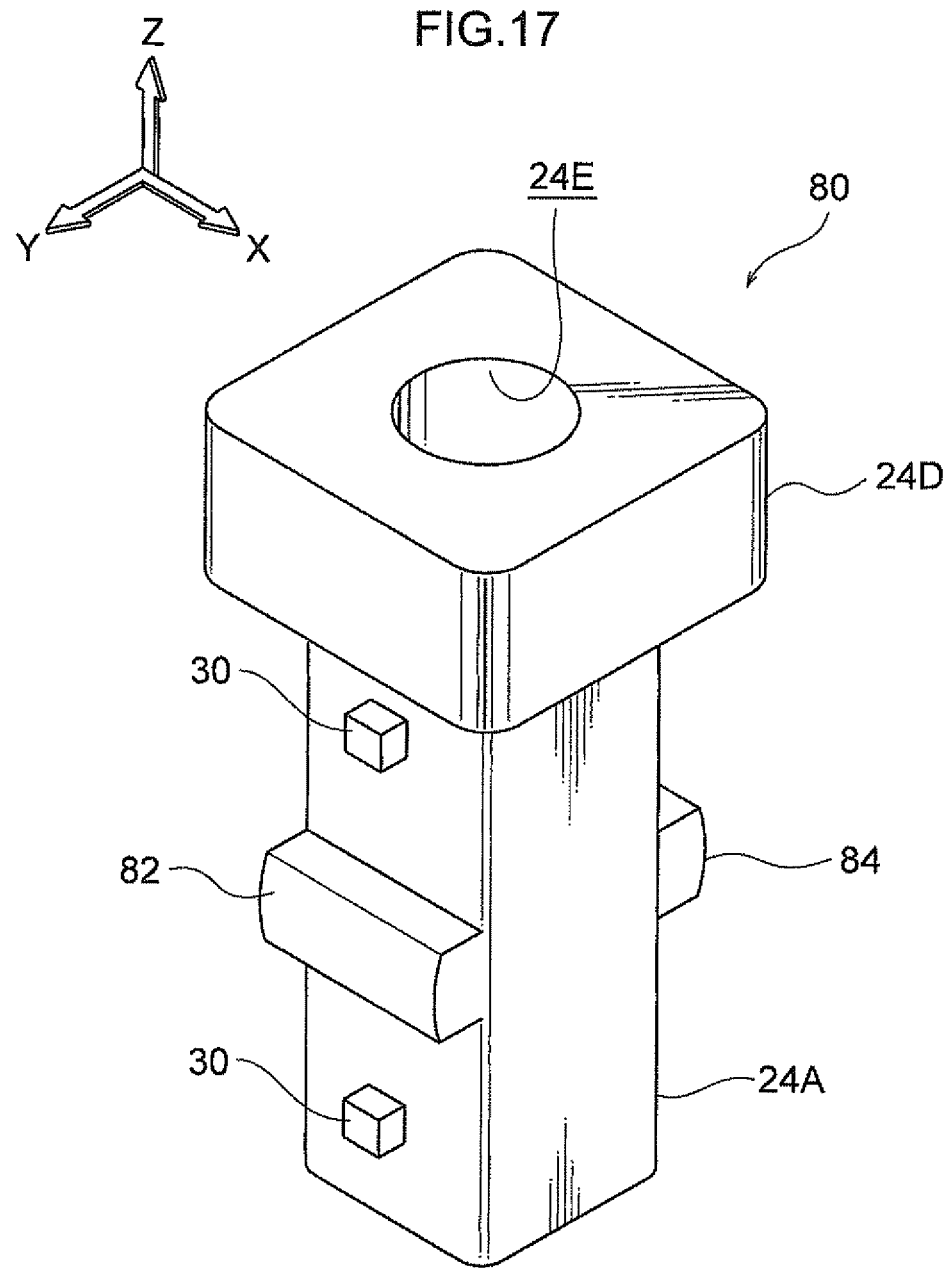
FIG. 17 is a perspective diagram of the headrest support shown in FIG. 16A.

This headrest support 80 is, like the headrest support 24 pertaining to the first embodiment, equipped with the body portion 24A and the lock portion 24D, but the lower guide portion 24B and the upper guide portion 24C are omitted. Instead, a pair of convex portions 82 and 84 are disposed on the body portion 24A of this headrest support 80. The one convex portion 82 is disposed on the front side surface of the body portion 24A (a side portion of the headrest support 80), and the other convex portion 84 is disposed on the back side surface of the body portion 24A (a side portion of the headrest support 80). Distal end portions of these convex portions 82 and 84 are formed in concentric curved surface shapes (circular cylinder surface shapes) (see FIG. 17).

Further, in this embodiment, a pair of opposing curved surfaces 86 and 88 are formed in mutually opposing positions on the inner peripheral portion of the support bracket 20C. These opposing curved surfaces 86 and 88 are formed in concentric circular arc shapes centering on an axis in the anteroposterior direction of the seatback 18. The distal end of the one convex portion 82 of the headrest support 80 slidably touches the one opposing curved surface 86. Further, the distal end of the other convex portion 84 of the headrest support 80 slidably touches the other opposing curved surface 88.

In this embodiment, the curved surfaces on the distal ends of the convex portions 82 and 84 slide on the opposing curved surfaces 86 and 88, whereby rotation of the headrest support 80 about an axis along the horizontal direction of the seatback 18 with respect to the support bracket 20C is guided. Further, the curved surfaces on the distal ends of the convex portions 82 and 84 touch the opposing curved surfaces 86 and 88, whereby movement of the headrest support 80 in the vertical direction of the seatback 18 with respect to the support bracket 20C is suppressed. Consequently, the same action and effects as the first embodiment are achieved. Moreover, because the pair of convex portions 82 and 84 that touch the pair of opposing curved surfaces 86 and 88 are disposed on the side portions of the headrest support 80, the vertical direction dimension of the headrest support 80 can be shortened.

Fifth Embodiment

Figure 18:
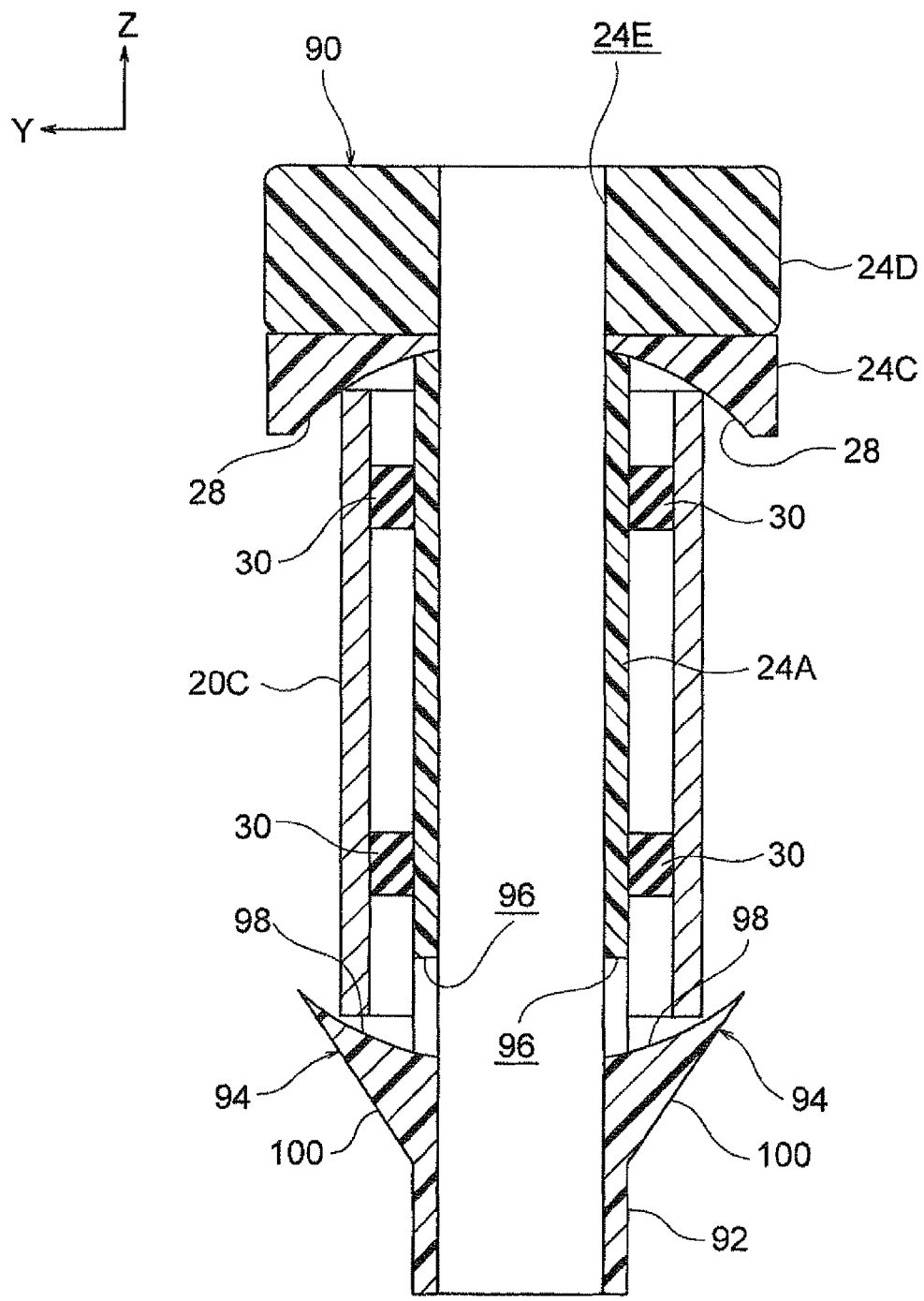
FIG. 18 is a cross-sectional diagram showing a headrest support and a support bracket of a vehicular seat pertaining to a fifth embodiment of the present invention as seen from the left side of the seatback.

In FIG. 18, a partial configuration of a vehicular seat pertaining to a fifth embodiment of the present invention is shown in a general front diagram. This embodiment is given basically the same configuration as that of the first embodiment, except that in this embodiment the configuration of a headrest support 90 differs from that of the headrest support 24 pertaining to the first embodiment.

Figure 19:
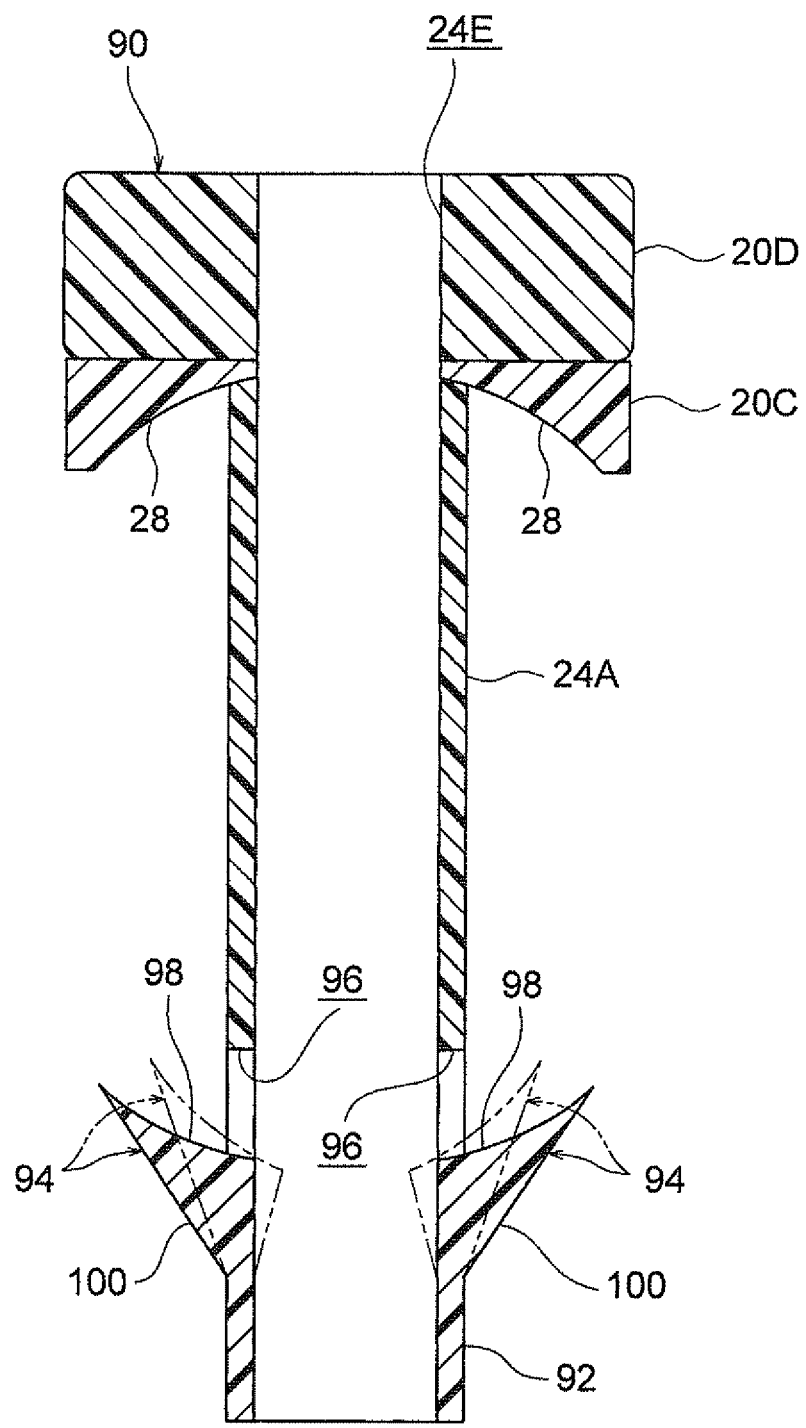
FIG. 19 is a cross-sectional diagram of the headrest support shown in FIG. 18.

The headrest support 90 is given basically the same configuration as that of the headrest support 24 pertaining to the first embodiment, except that the configuration of a lower guide portion 92 differs from that of the lower guide portion 24B pertaining to the first embodiment. A pair of flexurally deforming portions 94 capable of elastically flexural deformation are disposed on this lower guide portion 92. These flexurally deforming portions 94 are placed on mutually opposite sides in the radial direction of the through hole 24E and, as indicated by the two-dotted chain line in FIG. 19, are configured to be flexurally deformable in a direction where they become closer to each other. Holes 96 for allowing the flexural deformation of the pair of flexurally deforming portions 94 are formed in the body portion 24A and the lower guide portion 92.

Lower side curved surfaces 98 are formed on upper surfaces of the flexurally deforming portions 94. These lower side curved surfaces 98 are formed in circular cylinder surface shapes concentric with the upper side curved surface 28. Further, slanting surfaces 100 are respectively formed on outside portions (portions on the opposite side of the through hole 24E) of the flexurally deforming portions 94.

Here, when this headrest support 90 is to be mounted on the support bracket 20C, the headrest support 90 is inserted inside an open portion in the upper end of the support bracket 20C from its lower end side (the lower guide portion 92 side). During this insertion, the slanting surfaces 100 of the pair of flexurally deforming portions 94 slide on the upper end of the support bracket 20C, and the pair of flexurally deforming portions 94 flexurally deform in a direction where they become closer to each other. Thus, it becomes possible to insert the headrest support 90 inside the cylinder of the support bracket 20C. Additionally, when the headrest support 90 is inserted inside the support bracket 20C until the upper side curved surface 28 touches the upper end of the support bracket 20C, the lower guide portion 92 projects from the lower side of the support bracket 20C and the pair of flexurally deforming portions 94 elastically return in a direction where they move away from each other (see FIG. 18). Thus, the upper side curved surface 28 of the pair of flexurally deforming portions 94 opposes the lower end of the support bracket 20C.

In this embodiment also, the lower side curved surfaces 98 of the headrest support 90 slide on the lower end of the support bracket 20C and the upper side curved surface 28 slides on the upper end of the support bracket 20C, whereby rotation of the headrest support 90 about an axis along the left-right direction of the seatback 18 with respect to the support bracket 20C is guided. Further, the lower side curved surfaces 98 touch the lower end of the support bracket 20C and the upper side curved surface 28 touches the upper end of the support bracket 20C, whereby movement of the headrest support 90 in the vertical direction of the seatback 18 with respect to the support bracket 20C is suppressed. Consequently, the same action and effects as the first embodiment are achieved. Moreover, when the headrest support 90 is to be mounted on the support bracket 20C, it suffices just to insert the headrest support 90 inside the cylinder of the support bracket 20C, so mounting work is easy. Consequently, the manufacturing efficiency of the vehicular seat can be improved.

Sixth Embodiment

Figure 20A:
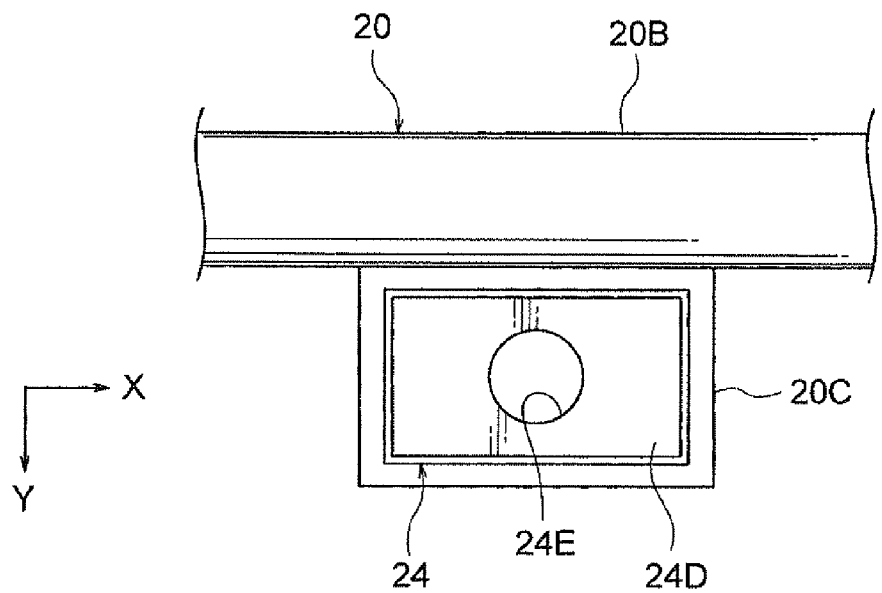
FIG. 20A is a plan diagram showing a headrest support and a support bracket of a vehicular seat pertaining to a sixth embodiment of the present invention and shows a state where the headrest support has been inserted inside a cylinder of the support bracket.
Figure 20B:
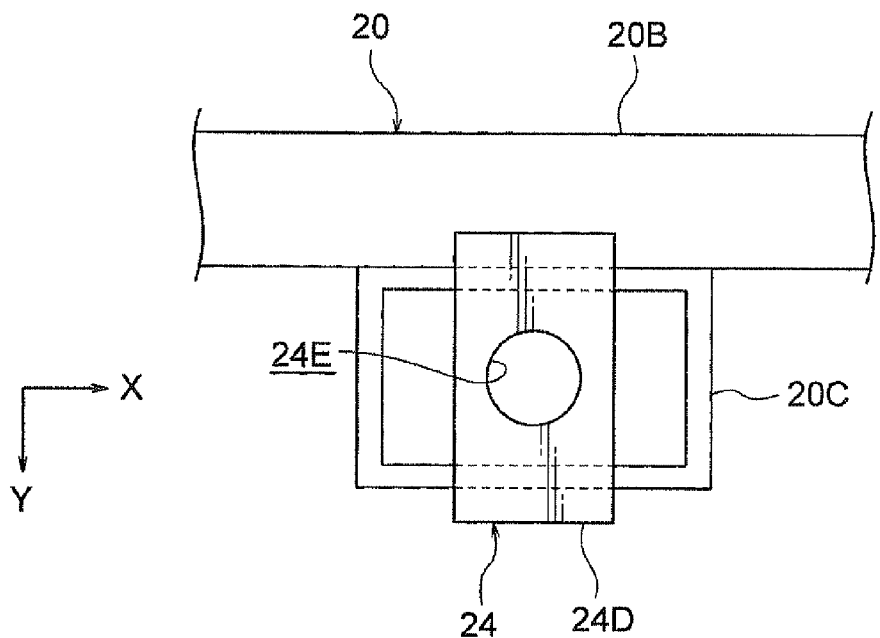
FIG. 20B is a plan diagram showing a state where the headrest support shown in FIG. 20A has been rotated 90 degrees about an axis in a vertical direction and mounted with respect to the support bracket.

In FIG. 20A and FIG. 20B, a partial configuration of a vehicular seat pertaining to a sixth embodiment of the present invention is shown in general front diagrams. This embodiment is given basically the same configuration as that of the first embodiment, except that in this embodiment the support bracket 20C and the headrest support 24 are formed in elongate shapes when seen from the vertical direction of the seatback 18. When the headrest support 24 is to be mounted on the support bracket 20C, first, as shown in FIG. 20A, the headrest support 24 is inserted inside the cylinder of the support bracket 20C. Then, as shown in FIG. 20B, the headrest support 24 is rotated 90 degrees about an axis in the vertical direction with respect to the support bracket 20C, whereby the lower side curved surface 26 (not shown in FIG. 20 A and FIG. 20B) of the headrest support 24 is made to touch the lower end of the support bracket 20C and the upper side curved surface 28 (not shown in FIG. 20A and FIG. 20B) of the headrest support 24 is made to touch the upper end of the support bracket 20C. In this embodiment also, the work of mounting the headrest support 24 on the support bracket 20C can be made easy.

The present invention has been described above by way of embodiments, but these embodiments are only examples and can be variously altered and implemented within a scope that does not depart from the gist of the invention. Further, it goes without saying that the scope of the rights of the present invention is not limited to these embodiments.

EXPLANATION OF THE REFERENCE NUMERALS

10 Vehicular Seat
14 Headrest
18 Seatback
20 Seatback Frame (Frame)
20C Support Bracket (Support Body)
24 Headrest Support
26 Lower Side Curved Surface
28 Upper Side Curved Surface
30 Rubber Member (Elastic Member, Energizing Means)
32A Leg Portion
60 Upper End Curved Surface
62 Lower End Curved Surface
64 Headrest Support
66 Upper Side Touching Portion
68 Lower Side Touching Portion
70 Headrest Support
72, 74 Spindles
76, 78 Bearing Holes
80 Headrest Support
82, 84 Convex Portions
86, 88 Opposing Curved Surfaces

The invention claimed is:

1. A vehicular seat equipped with a headrest support to which a leg portion of a headrest is coupled and a support body that is disposed on a frame of a seatback and supports the headrest support,
   wherein the headrest support and the support body slidably touch each other at curved surfaces disposed on either one or both, rotation of the headrest support about an axis along a horizontal direction of the seatback with respect to the support body is guided by sliding at the curved surfaces, and movement of the headrest support in a vertical direction of the seatback with respect to the support body is suppressed by the touching at the curved surfaces,
   wherein the support body is formed in a cylindrical shape and is placed in a state where its axial direction is along the vertical direction of the seatback, and the headrest support is inserted inside the cylinder of the support body, and
   wherein the headrest support is provided with the curved surfaces, the curved surfaces including (1) an upper side curved surface that slidably touches an upper end of the support body and (2) a lower side curved surface that slidably touches a lower end of the support body.

2. The vehicular seat according to claim 1, wherein the vehicular seat includes energizing means that energize the headrest support toward a predetermined position in its range of rotation with respect to the support body.

3. The vehicular seat according to claim 2, wherein the energizing means are elastic bodies that are disposed between the support body and the headrest support and elastically deform during the rotation.

4. The vehicular seat according to claim 2, wherein the energizing means are elastic portions that are disposed on the headrest support and elastically deform during the rotation.

5. The vehicular seat according to claim 1, wherein the headrest support is configured to be rotatable about an axis in a left-right direction of the seatback with respect to the support body, and at least one of a lower end side of the headrest support and a lower end side of the leg portion is configured as a load input portion for receiving a load inputted from a front side of the seatback and is placed further on a lower side of the seatback than the support body.

* * * * *